(12) United States Patent
Berta

(10) Patent No.: US 7,291,676 B2
(45) Date of Patent: Nov. 6, 2007

(54) POLYOLEFIN COMPOSITION WITH IMPROVED ABRASION RESISTANCE

(75) Inventor: Dominic A. Berta, Newark, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 231 days.

(21) Appl. No.: 10/495,615

(22) PCT Filed: Sep. 15, 2003

(86) PCT No.: PCT/IB03/04144

§ 371 (c)(1),
(2), (4) Date: May 13, 2004

(87) PCT Pub. No.: WO2004/026956

PCT Pub. Date: Apr. 1, 2004

(65) Prior Publication Data

US 2005/0020755 A1    Jan. 27, 2005

Related U.S. Application Data

(60) Provisional application No. 60/411,395, filed on Sep. 17, 2002.

(51) Int. Cl.
*C08L 23/10* (2006.01)
*C08L 23/12* (2006.01)
*C08L 53/02* (2006.01)

(52) U.S. Cl. ............................ 525/95; 525/97; 525/98; 525/99; 524/487

(58) Field of Classification Search .................. 525/95, 525/97, 98, 99; 524/487
See application file for complete search history.

(56) References Cited

U.S. PATENT DOCUMENTS

| 4,323,534 | A | 4/1982 | DesMarais |
| 4,355,425 | A | 10/1982 | Jones et al. |
| 5,075,173 | A | 12/1991 | Benefield et al. |
| 5,959,030 | A | 9/1999 | Berta |
| 5,962,573 | A | 10/1999 | Berta |
| 6,013,734 | A | 1/2000 | Berta |
| 6,177,515 | B1 | 1/2001 | Smith et al. |
| 6,407,168 | B1 * | 6/2002 | Sugita et al. .................. 525/88 |
| 6,433,063 | B1 * | 8/2002 | Berta .......................... 524/487 |
| 6,448,335 | B1 | 9/2002 | Braga et al. |
| 6,667,367 | B1 | 12/2003 | Berta |

FOREIGN PATENT DOCUMENTS

| EP | 472946 | 3/1992 |
| EP | 0472946 | 3/1992 |
| EP | 936246 | 8/1999 |
| WO | 99/10160 | 8/1999 |
| WO | 03/011962 | 2/2003 |
| WO | 03011962 | 2/2003 |

* cited by examiner

Primary Examiner—James J. Seidleck
Assistant Examiner—Olga Asinovsky
(74) Attorney, Agent, or Firm—William R Reid

(57) ABSTRACT

A composition comprising: (I) 55 to 95% by weight of an heterophasic polyolefin composition comprising 8 to 50% by weight of a crystalline propylene polymer fraction and 50 to 92% by weight of an elastomeric propylene fraction; (II) 2 to 20% by weight of an oxidized polyethylene wax having an acid number of 5 to 35 mg KOHIg, a molecular weight Mn of 1,000 to 100,000, and a melting point comprised between 92° C. and 140° C.; and (III) 3 to 25% by weight of a styrene block copolymer.

18 Claims, No Drawings

POLYOLEFIN COMPOSITION WITH IMPROVED ABRASION RESISTANCE

This application is the U.S. national phase of International Application PCT/IB2003/00144, filed Sept. 15, 2003.

The present invention concerns soft, highly flexible polyolefin compositions having improved abrasion resistance.

Polyolefin compositions having elastic properties while maintaining a good thermoplastic behavior have been used in many application fields, due to the valued properties, which are typical of polyolefins (such as chemical inertia, mechanical properties and nontoxicity). Moreover, they can be advantageously transformed into finished products with the same techniques used for thermoplastic polymers.

In particular, flexible polymer materials are widely used in the medical field (e.g. in the production of containers for plasma or intravenous solutions, or phleboclysis tubes), as well as for packaging, extrusion coating and electrical wires and cables covering.

In many of these applications, vinyl chloride polymers containing adequate plasticizers, which are necessary to give said polymers their desired flexibility characteristics, are presently used. Said polymer products, however, are subject to ever increasing criticism both for the suspected toxicity of the plasticizers they contain and because when incinerated, they can disperse into the atmosphere extremely toxic by-products, such as dioxin and corrosive products such as hydrochloric acid. It would be very useful, therefore, to substitute said materials with products which besides the desired flexibility characteristics and, optionally, transparency, would have the chemical inertness and non-toxicity typical of olefin polymers.

Elastic polypropylene compositions retaining good thermoplastic behavior has been obtained in the art by way of sequential copolymerization of propylene, optionally containing minor quantities of olefin comonomers, and then ethylene/propylene or ethylene/alpha-olefin mixtures. Catalysts based on halogenated titanium compounds supported on magnesium chloride were commonly used for this purpose.

For instance, EP 472 946 describes elastoplastic polyolefin compositions obtained by sequential polymerization comprising in parts by weight:
A) 10–50 parts of an isotactic propylene homopolymer or copolymer;
B) 5–20 parts of an ethylene copolymer, insoluble in xylene at room temperature; and
C) 40–80 parts of an ethylene/propylene copolymer containing less than 40% by weight of ethylene and being soluble in xylene at room temperature; the intrinsic viscosity of said copolymer is preferably from 1.7 to 3 dl/g.

Said compositions have a flexural modulus of less than 150 MPa and Shore A hardness of about 90.

The International application PCT/EP02/03880 describes more flexible elastoplastic polyolefin compositions comprising, by weight:
A) 8 to 25% of a crystalline polymer fraction selected from propylene homopolymer and propylene copolymers with a $C_{4-8}$ alpha-olefin;
B) 75 to 92% an elastomeric fraction comprising two different propylene elastomeric copolymers, and more specifically:
(1) a first elastomeric copolymer of propylene with 15 to 32% of a $C_{4-8}$ alpha-olefin, having solubility in xylene at room temperature greater than 50%, the intrinsic viscosity of the xylene soluble fraction ranging from 3.0 to 5.0 dl/g; and
(2) a second elastomeric copolymer of propylene with more than 32% up to 45% of a $C_{4-8}$ alpha-olefin, having solubility in xylene at room temperature greater than 80% by weight, the intrinsic viscosity of the xylene soluble fraction ranging from 4.0 to 6.5 dl/g;

the (1)/(2) weight ratio ranging from 1:5 to 5:1.

These polyolefin compositions have flexural modulus lower than 60 MPa, Shore A hardness lower than 90, and tension set at 100% lower than 35%.

Especially for applications such as hoses, soft switches, straps, casters, gaskets, handles, grips, and pen sleeves, one of the important properties needed is the abrasion resistance, which is directly correlated to the wear characteristics of the parts made from the polymer composition. The abrasion resistance is commonly measured by a Taber test or a scuff test.

Very soft elastoplastic polyolefin compositions, like the ones described in the International Application PCT/EP02/03880, having Shore A values lower than 100, show very poor abrasion resistance.

U.S. Pat. No. 6,013,734 describes polymer compositions for making molded parts including (1) a thermoplastic polyolefin, (2) a propylene polymer material and (3) an oxidized polyethylene wax; injection molded parts made from this composition show good paint adhesion and good durability in painted parts, i.e. the paint can not be easily removed. The abrasion resistance of the polymer composition is never mentioned.

Therefore, it is felt the need for flexible polyolefin compositions, having lower modulus or hardness values, which maintain at the same time good abrasion resistance, as required for some automotive applications, such as floor mats, hoses, side moldings, handles and grips.

The Applicant has surprisingly found that, by adding specific amounts of oxidized polyethylene wax in association with specific amounts of styrene block copolymers to soft heterophasic polyolefin compositions, it is possible to obtain a very good balance of abrasion resistance and softness values.

The present invention concerns a composition comprising:

(I) 55 to 95% by weight of an heterophasic polyolefin composition comprising the following fractions:
A) from 8 to 50% by weight of a crystalline polymer fractions selected from the group consisting of:
(i) a propylene homopolymer, having solubility in xylene at room temperature lower than 10% by weight;
(ii) a copolymer of propylene and at least one alpha-olefin of formula $H_2C=CHR^1$, where $R^1$ is H or a $C_{2-10}$ linear or branched alkyl, containing at least 85% by weight of propylene, having solubility in xylene at room temperature lower than 15% by weight;
(iii) a mixture of (i) and (ii);
B) from 50 to 92% by weight of an elastomeric fraction comprising an elastomeric copolymer of propylene or ethylene with at least another alpha-olefin of formula $H_2C=CHR^2$, where $R^2$ is H or a $C_{1-10}$ linear or branched alkyl, optionally containing 0.5 to 5% by weight of a diene, said elastomeric copolymer containing from 15 to 55% by weight alpha-olefin, and having solubility in xylene at room temperature greater than 75% by weight, the intrinsic viscosity of the xylene soluble fraction ranging from 3.0 to 6.5 dl/g;

(II) 2 to 20% by weight of an oxidized polyethylene wax having an acid number of 5 to 35 mg KOH/g, a molecular weight Mn of 1,000 to 100,000, and a melting point comprised between 92° C. and 140° C.; and (III) 3 to 25% by weight of a styrene block copolymer.

The compositions of the invention, wherein the heterophasic polyolefin composition is preferably prepared by sequential polymerization in at least two stages, have a 100% modulus lower than 6 MPa, Shore A hardness lower than 95, and elongation at break greater than 225%.

Another object of the present invention is a plasticized composition comprising:
100 parts by weight of a composition comprising components (I), (II) and (III) as defined above, and
5 to 50 parts by weight of a plasticizer (IV).

The compositions of the invention exhibit very low modulus and hardness values and, at the same time, display very good abrasion resistance, which is typical of less flexible and softer compositions.

The compositions of the present invention preferably comprise:

(I) 65 to 90% by weight of an heterophasic polyolefin composition comprising the following fractions:
A) from 10 to 25% by weight of a crystalline polymer fraction selected from the group consisting of:
  (i) a propylene homopolymer, having solubility in xylene at room temperature lower than 10% by weight;
  (ii) a copolymer of propylene and at least one alpha-olefin of formula $H_2C=CHR^1$, where $R^1$ is H or a $C_{2-10}$ linear or branched alkyl, containing at least 85% by weight of propylene, having solubility in xylene at room temperature lower than 15% by weight; and
  (iii) a mixture of (i) and (ii);
B) from 75 to 90% by weight of an elastomeric fraction comprising an elastomeric copolymer of propylene or ethylene with at least another alpha-olefin of formula $H_2C=CHR^2$, where $R^2$ is H or a $C_{1-10}$ linear or branched alkyl, optionally containing 0.5 to 5% by weight of a diene, said elastomeric copolymer containing from 20 to 50% by weight alpha-olefin, and having solubility in xylene at room temperature greater than 80% by weight, the intrinsic viscosity of the xylene soluble fraction ranging from 4.0 to 5.5 dl/g;

(II) 5 to 15% by weight of an oxidized polyethylene wax having an acid number of 5 to 35 mg KOH/g, a molecular weight Mn of 1,000 to 100,000, and a melting point comprised between 92° C. and 140° C.; and (III) 5 to 20% by weight of a styrene block copolymer.

The polyolefin composition (I) of the compositions of the invention comprise from 8 to 50% by weight, preferably from 10 to 25%, and even more preferably from 12 to 20% of crystalline polymer fraction (A), and from 50 to 92% by weight, preferably from 75 to 90%, and even more preferably from 80 to 88% of elastomeric fraction (B).

The crystalline polymer fraction (A) of the compositions of the invention is (i) a propylene homopolymer, (ii) a copolymer of propylene with at least one alpha-olefin of formula $H_2C=CHR^1$, where $R^1$ is H or a $C_{2-6}$ linear or branched alkyl, or a mixture of (i) and (ii).

The homopolymer (i) has solubility in xylene at room temperature lower than 10% by weight, preferably lower than 5%, and even more preferably lower than 3%.

By "room temperature" is meant herein a temperature of about 25° C.

The copolymer of propylene (ii) contains at least 85% by weight of propylene, preferably at least 90% propylene, and has solubility in xylene at room temperature lower than 15% by weight, preferably lower than 10%, and even more preferably lower than 8%. Said alpha-olefin is preferably ethylene, butene-1, pentene-1,4-methylpentene, hexene-1, octene-1 or combinations thereof, and even more preferably the copolymer of propylene (ii) is a copolymer of propylene and ethylene.

The heterophasic polyolefin composition (I) comprises from 50 to 92%, and preferably from 75 to 90% by weight of an elastomeric fraction (B). By "elastomeric" is meant herein a polymer having low crystallinity or amorphous, having a solubility in xylene at room temperature greater than 50% by weight.

According to a preferred embodiment of the compositions of the present invention, the elastomeric fraction (B) of the polyolefin compositions of the invention comprises:
(1) a first elastomeric copolymer of propylene with at least an alpha-olefin of formula $H_2C=CHR^3$, where $R^3$ is H or a $C_{2-10}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and
(2) a second elastomeric copolymer of propylene with at least an alpha-olefin of formula $H_2C=CHR^4$, where $R^4$ is H or a $C_{2-10}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;

the (1)/(2) weight ratio ranging from 1:5 to 5:1.

More preferably, the first elastomeric copolymer (1) is a copolymer of propylene with at least an alpha-olefin selected from ethylene, butene-1, hexene-1 and octene-1; even more preferably is a copolymer of propylene with ethylene. The alpha-olefin content ranges from 15 to 32% by weight, preferably from 25 to 30%. The first elastomeric copolymer (1) has a solubility in xylene at room temperature greater than 50% by weight, preferably greater than 70%, and even more preferably greater than 80%; the intrinsic viscosity of the xylene soluble fraction ranges from 3.0 to 5.0 dl/g, more preferably from 3.5 to 4.5 dl/g, and even more preferably from 3.8 to 4.3 dl/g.

The second elastomeric copolymer (2) is preferably a copolymer of propylene with at least an alpha-olefin selected from ethylene, butene-1, hexene-1 or octene-1, and even more preferably is a copolymer of propylene with ethylene. The alpha-olefin content is greater than 32% up to 45% by weight, and preferably ranges from 35 to 40%. The elastomeric copolymer (2) has solubility in xylene at room temperature greater than 80% by weight, preferably greater than 85%, and the intrinsic viscosity of the xylene soluble fraction ranges from 4.0 to 6.5 dl/g, preferably from 4.5 to 6.0, and more preferably from 5.0 to 5.7 dl/g.

According to another preferred embodiment of the compositions of the present invention, the elastomeric fraction (B) of the polyolefin compositions of the invention comprises:
(1') a first elastomeric copolymer of propylene with ethylene, optionally containing 0.5 to 5% by weight of a diene, containing from 20 to 35% by weight ethylene, and having solubility in xylene at room temperature greater than 70% by weight, the intrinsic viscosity of the xylene soluble fraction ranging from 3.0 to 6.0 dl/g; and (2') a second elastomeric copolymer of ethylene with at least an alpha-olefin of formula $H_2C=CHR^5$, where $R^5$ is a $C_{2-10}$ linear or branched alkyl, optionally containing 0.5 to 5% by weight of a diene, containing from 15% to 40% by weight alpha-olefin, and having solubility in xylene at room temperature greater than 25% by weight, the intrinsic viscosity of the xylene soluble fraction ranging from 0.5 to 5.0 dl/g;

the (1')/(2') weight ratio ranging from 1:5 to 5:1.

More preferably, the first elastomeric copolymer (1') has an ethylene content ranging from 25 to 30% by weight, and a solubility in xylene at room temperature greater than 75% by weight, the intrinsic viscosity of the xylene soluble fraction ranges from 3.5 to 5.0 dl/g.

The second elastomeric copolymer (2') has an alpha-olefin content ranging from 20 to 35% by weight, and a solubility in xylene at room temperature greater than 30% by weight, the intrinsic viscosity of the xylene soluble fraction ranges from 1.0 to 4.5 dl/g. The alpha-olefin is preferably selected from butene-1, hexene-1 and octene-1.

The copolymerization of propylene and ethylene or another alpha-olefin or combinations thereof, to form the copolymers (1) and (2), or (1') and (2') of the elastomeric fraction (B) can occur in the presence of a diene, conjugated or not, such as butadiene, 1,4-hexadiene, 1,5-hexadiene and ethylidene-norbornene-1. The diene, when present, is contained in an amount of from 0.5 to 5% by weight, with respect to the weight of the fraction (B).

The weight ratio of the elastomeric copolymers (1)/(2) or (1')/(2') ranges from 1:5 to 5:1, preferably from 1:2 to 4:1, and even more preferably from 1:1 to 2:1.

The heterophasic polyolefin composition (I) can present crystallinity deriving from poly-alpha-olefin sequences, and preferably from polyethylene sequences, due to the partial formation of such sequences in the polymerization of the elastomeric copolymers (B)(1) and (2), or (B)(1') and (2'). This crystallinity may be detected by measuring the heat of fusion deriving from poly-alpha-olefin sequences (e.g. PE enthalpy) by means of Differential Scanning Calorimetry (DSC) analysis; in DSC, the composition may present at least a melting peak attributable to a crystalline PE phase, i.e. to $(CH_2)_n$ sequences of the crystalline type. In the compositions of the invention, the heat of fusion of peaks present below 130° C. and attributable to polyethylene sequences is preferably greater than 3 J/g.

According to a preferred embodiment of the invention, the heterophasic polyolefin composition (I) is in the form of spherical particles having an average diameter of 250 to 7,000 microns, a flowability of less than 30 seconds and a bulk density (compacted) greater than 0.4 g/ml.

The heterophasic polyolefin composition (I) may be prepared by sequential polymerization in at least two stages; according to a preferred embodiment, the sequential polymerization is carried out in the presence of a catalyst comprising a trialkylaluminum compound, optionally an electron donor, and a solid catalyst component comprising a halide or halogen-alcoholate of Ti and an electron-donor compound supported on anhydrous magnesium chloride.

The heterophasic polyolefin composition (I) may be prepared in at least two sequential polymerization stages, with each subsequent polymerization being conducted in the presence of the polymeric material formed in the immediately preceding polymerization reaction, wherein the crystalline polymer fraction (A) is prepared in at least one first stage, and the elastomeric fraction (B) is prepared in at least one second stage. The polymerization stages may be carried out in the presence of a Ziegler-Natta and/or a metallocene catalyst.

The polymerization process is described in details in the International Patent Application PCT/EP02/03880, the content of which is incorporated herein by reference.

According to a preferred embodiment, the polymerization process of the invention comprises three stages, all carried out in the presence of Ziegler-Natta catalysts, where: in the first stage the relevant monomer(s) are polymerized to form the fraction (A); in the second stage a mixture of propylene and/or ethylene and another alpha-olefin, and optionally a diene are polymerized to form the elastomeric copolymer (B)(1) or (1'); and in the third stage a mixture of propylene and/or ethylene, and another alpha-olefin and optionally a diene, are polymerized to form the elastomeric copolymer (B)(2) or (2').

Component (II) of the compositions of the invention is an oxidized polyethylene wax having an acid number from 5 to 35 mg KOH/g, and preferably from 10 to 25 mg KOH/g; a molecular weight Mn of 1,000 to 100,000, and preferably 2,000 to 50,000; and a melting point comprised between 92° C. to 140° C., and preferably between 110° C. and 140° C.

The amount of the oxidized polyethylene wax in the compositions of the invention ranges from 2 to 20% by weight, preferably from 5 to 15% by weight, and most preferably from 8 to 12% by weight.

Oxidized polyolefin wax types are generally prepared by air oxidation or suspension oxidation of a polyolefin. Suitable oxidized polyolefin waxes are commercially available under the name of Petrolite waxes, from Baker-Petrolite Corporation, or commercially available under the name of AC waxes, from Allied Signal.

The compositions of the instant invention further comprise 3 to 25% by weight, preferably 8 to 20% by weight of a styrene block copolymer (III); this component is a hydrogenated or a non-hydrogenated styrene block copolymer.

These block copolymers have blocks derived from a diene, such as polybutadiene or polyisoprene blocks, and blocks derived from polystyrene or derivatives thereof.

The block copolymers may be of different types, for example of the AB, ABA, A(B)$_4$ type.

Said block copolymers may be hydrogenated; a mixture of two or more of the above-mentioned block copolymers may be used.

Preferably, the block copolymer has formula A-B-A', where A and A' are each a thermoplastic endblock which includes a styrenic moiety and where B is an elastomeric elastomeric polybutadiene, poly(ethylenebutylene) or poly (ethylenepropylene) midblock. Preferably, the A and A' endblocks of the block copolymer are identical and are selected from the group consisting of polystyrene and polystyrene homologs, and even more preferably the A and A' endblocks are polystyrene or poly(alpha-methylstyrene).

Preferred block copolymers are styrene-butadiene-styrene polymers, referred to as SBS. Since the main chain of an SBS contains unsaturations which are oxidation sensitive, at least part of the aliphatic unsaturations of the copolymer is preferably hydrogenated, these products are commercially available elastomeric A-B-A' block copolymers having a saturated or essentially saturated poly(ethylene-butylene) midblock B comprising units having formula:

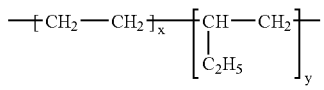

where x and y are positive integers, and polystyrene endblocks A and A' each represented by the formula:

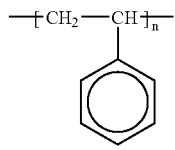

where n is a positive integer, and are referred to as SEBS block copolymers.

SBS and SEBS are available under the trade designation Kraton D, such as Kraton D 1101 and 1107, and Kraton G, such as Kraton G 1650, Kraton G 1652 and Kraton GX 1657, from Kraton Polymers. Materials of this general type are disclosed in U.S. Pat. Nos. 4,323,534 and 4,355,425.

Other styrene block copolymers suitable for the compositions of the invention are styrene-ethylenepropylene-styrene polymers, referred to as SEPS commercially available under the name Septon from Kuraray America Inc.

The compositions of the invention have a 100% modulus lower than 6 MPa, preferably from 1 to 5 MPa; Shore A (5 seconds) hardness lower than 95, preferably from 50 to 90, and elongation at break of greater than about 225%.

The improvement (i.e. reduction) in Taber Abrasion for compositions of the present invention is at least 22% over control compositions having the same components, but without the oxidized polyethylene wax (II).

Another object of the present invention is a plasticized composition comprising:

100 parts by weight of a composition comprising components (I), (II) and (III) as defined above, and 5 to 50 parts by weight, preferably from 10 to 40 parts, and even more preferably 10 to 30 parts of a plasticizer (IV).

The plasticizer is preferably selected from mineral oil, process oil, aromatic oil, naphthenic oil, paraffin oil, linear dodecylbenzene, dialkylbenzenes, diphenylalkanes and mixtures thereof, and preferably the plasticizer is a mineral, process or paraffin oil.

Surprisingly, the mechanical properties, and in particular the abrasion resistance and scuff of soft thermoplastic polyolefin compositions are highly improved by the addition of an oxidized polyolefin wax in association with a styrene block copolymer, as reported above.

The compositions of the present invention find application particularly in the automotive, the packaging and industrial or household fields, as well as injection molded articles. In particular, in automotive applications, they may be used in the preparation of floor mats, hoses, side moldings, handles and grips.

Therefore, the present invention is further directed to an article comprising the above-described composition.

Depending on the properties needed for the different applications, conventional additives, fillers and pigments, commonly used in olefin polymers, may be added, such as nucleating agents, mineral fillers and other organic and inorganic pigments.

The following analytical methods have been used to determine the properties reported in the detailed description and in the examples.

| Property | Method |
|---|---|
| Shore Hardness D | ASTM D 2240 |
| Shore Hardness A | ASTM D 2240 |
| 100% Modulus | ASTM D 412-92 |
| Tensile strength at break | ASTM D 412-92 |
| Elongation at break | ASTM D 412-92 |
| Taber Abrasion: | a Taber Abraser model 5150, available from Taber Industries, was used with Calibrade H-18 type abrading wheels and 1,000 g weights in place to provide the abrading force for determining the Taber abrasion resistance. A 10 cm diameter disc was cut from 2 mm thick compression molded plaque and fastened to the Abraser platform. The two H-18 wheels (right and left side) were gently dropped and allowed to come in contact with the surface of the sample, then the unit's power was turned on to rotate the sample for 5,000 cycles. Prior to placing the sample on the platform it was weighted. After 5,000 cycles rotation was stopped, the sample brushed off to remove loose material, and the sample re-weighted. The weight loss in mg was determined by subtraction then dividing by 5 to obtain the Taber abrasion in mg/1000 cycles. |
| Scuff Test: | The scuff was measured by fastening the sample (2 mm, 10 cm diameter disc) to the Taber Abraser platform, gently dropping a type A stylus (with a 908 gram weight in place above it to provide the force) onto the sample surface, and rotating the sample for 500 cycles to scuff the surface. The sample was removed and examined visually for surface mar. Rating was done visually. A very good rating was given for samples showing little scuffing or maring of the surface in contact with the stylus. A very poor rating was given for samples showing deep gouging with tear marks appearing on the surface in contact with the stylus. Rating of good, moderate and poor were given to samples progressively worse than very good. Model 503-13 scuffing head attachment was used for the scuff test. |

Products Used in the Working Examples:

| | |
|---|---|
| HPO-1: | heterophasic polyolefin comprising 33% by weight of a crystalline propylene/ethylene copolymer, having an ethylene content of 3.8% by weight and solubility in xylene at room temperature of 5.5% by weight, and 67% by weight of a propylene/ethylene elastomeric copolymer, having an ethylene content of 28% by weight, solubility in xylene at room temperature of 89% by weight and IV of the soluble fraction of 3.8 dl/g. |
| HPO-2: | heterophasic polyolefin comprising 44% by weight of crystalline propylene homopolymer, having solubility in xylene at room temperature of 3.25% by weight, and 56% by weight of a propylene/ethylene elastomeric copolymer, having an ethylene content of 50% by weight, solubility in xylene at room temperature of 82% by weight and IV of the soluble fraction of 4.0 dl/g. |
| HPO-3: | heterophasic polyolefin comprising 39% by weight of a crystalline propylene homopolymer, having solubility in xylene at room temperature of 3.5% by weight, and 61% by weight of a propylene/ethylene elastomeric copolymer, having an ethylene content of 59% by weight, solubility in xylene at room temperature of 78% by weight and IV of the soluble fraction of 4.2 dl/g. |
| HPO-4: | heterophasic polyolefin comprising 19% by weight of a crystalline propylene/ethylene copolymer, having an ethylene content of 3.6% by weight and solubility in xylene at room temperature of 6% by weight, and 81% by weight of an elastomeric fraction comprising: 69% of a first propylene/ethylene elastomeric copolymer, having an ethylene content of 27% by weight, solubility in xylene at room temperature of 92% by weight and IV of the soluble fraction of 4.28 dl/g; and 31% of a second butylene/ethylene elastomeric copolymer, having an ethylene content of 75% by weight, solubility in xylene at room temperature of 47% by weight and IV of the soluble fraction of 3.6 dl/g. |
| EPR-1: | JSR EP057P is an ethylene/propylene rubber commercially available from Japan Synthetic Rubber |
| EPR-2: | Dutral CO 059 is a high Mooney viscosity ethylene/propylene rubber commercially available from Enichem |
| SEPS: | Septon 4077 is a styrene ethylene/propylene block copolymer commercially available from Kuraray America, Inc. |
| SBS: | Kraton D-1101 is a styrene/butadiene block copolymer commercially available from Kraton Polymers. |
| PE-WAX 1: | AC 316, commercially available from Allied Signal, is an oxidized polyethylene wax has having acid no. of 16, Mn of 10,000, viscosity of 8,500 cP at 149° C., density of 0.98 g/ml, MI >3,000 g/10 min and melting point of 140° C. |
| PE-WAX 2: | AC 325, commercially available from Allied Signal, is an oxidized polyethylene wax has having acid no. of 25, Mn of 6,000, viscosity of 4,400 cP at 149° C., density of 0.99 g/ml, MI >2,000 g/10 min and melting point of 136° C. |
| PE-WAX 3: | AC 307, commercially available from Allied Signal, is an oxidized polyethylene wax has having acid no. of 5–9, Mn of 50,000, viscosity of 85,000 cP at 149° C., density of 0.98 g/ml, MI >1,000 g/10 min and melting point of 140° C. |
| PE-WAX 4: | Petrolite E 2020, commercially available from Baker-Petrolite, is an oxidized polyethylene wax has having acid no. of 22, Mn of 2,500, viscosity of 75 cP at 149° C., MI >5,000 g/10 min and melting point of 116° C. |
| OIL: | Sunpar 2280 is a paraffin oil commercially available from Sun Oil Company |
| LLDPE: | linear low density polyethylene, with melt index of 0.5 g/10 min |
| Peroxide: | DBPH-50 Lupersol 101, 50% dispersion on clay, commercially available from R.T. Vanderbilt Co. |
| Crosslinking coagent: | Ricon 154 is a polybutadiene coagent commercially available from Sartomer Company |
| ZnO: | zinc oxide, available from Zinc Corporation of America |
| Carbon black: | Colonial 3300 is a carbon black dispersion in PE, commercially available from Colonial Rubber |
| Stabilizer: | Santonox TMBC is a sulfur bridge phenolic stabilizer, commercially available from Flexsys Corporation |

EXAMPLES 1–2 AND COMPARATIVE EXAMPLES 1–2

Polymer compositions according to the present invention were obtained by premixing the polymer components reported in Table 1 in a Henschel mill or a V-blender until the composition was uniform; the premix was then charged to a Haake internal mixer and mixed at 180° C. for about 5 minutes, with a rotor speed of 100 RPM using Banbury type blades.

Compression molding plaques for the various tests were obtained by removing the charge from the chamber and placing about 28 grams in a 4 section picture frame mold, each section being 11.4 by 11.4 cm, by 2 mm thick. The picture frame mold was sandwiched between about 0.6 cm thick steel platens. The platens were placed in a compression molding press, heat was applied to the platens in contact with the sample at 200° C. for 3 minutes, then pressure of about 206 MPa was applied to form the molten material into a plaque. After 3 minutes, the platens with the sample were transferred to another molding press with the temperature set at 70° C., pressure of about 206 MPa applied and allowed to cool and solidify for about 5 minutes or the temperature reached 80° C. or below.

None of the samples showed any evidence of bloom after 8 weeks time at 23° C.

The compositions of Comparative Examples 1–2 correspond to the ones of Examples 1–2, with the exception that no oxidized polyethylene wax was added. The properties of these compositions, and in particular, the Taber Abrasion and the Scuff values are reported in Table 1.

TABLE 1

|  | Ex. 1 | Ex. 2 | Comp. Ex. 1 | Comp. Ex. 2 |
|---|---|---|---|---|
| Components (% wt.) | | | | |
| HPO-1 | 36.5 | 73 | 39 | 68 |
| HPO-2 | 36.5 | — | 39 | — |
| SEPS | 10 | 10 | 10 | 20 |
| EPR-1 | 10 | 10 | 10 | 10 |
| PE-WAX 1 | 5 | 5 | — | — |
| Carbon black | 2 | 2 | 2 | 2 |
| Properties | | | | |
| Shore A (0/5 sec) | 90/90 | 86/85 | 92/91 | 85/85 |
| Shore D (5 sec) | 32 | 32 | 35 | 31 |
| 100% Modulus (MPa) | 4.6 | 4.3 | 4.7 | 4 |
| Tensile Strength at Break (MPa) | 7.6 | 11.2 | 9.4 | 14 |
| Elongation at Break (%) | 644 | 749 | 695 | 780 |
| Taber Abrasion (mg/1000 cycles) | 24 | 29 | 83 | 83 |
| Reduction in Abrasion (%) | 71 | 65 | — | — |
| Scuff test (500 cycles) | Slight | Very slight | moderate | Slight |

The above results demonstrate that the polyolefin compositions according to the present invention, containing an oxidized polyethylene wax (II) in association with a styrene block copolymer (III) have very good values of Taber Abrasion while retaining the flexibility of the polyolefin composition (I). The comparative compositions not containing the wax (II) show lower values of abrasion resistance.

EXAMPLES 3–6 AND COMPARATIVE EXAMPLES 3 AND 5–6

Polymer compositions according to the present invention were obtained as reported in Example 1. None of the samples showed any evidence of bloom.

The compositions of Comparative Examples 3-6 correspond to the ones of Examples 3–6, with the exception that no oxidized polyethylene wax was added. The properties of these compositions, and in particular, the Taber Abrasion and the Scuff values are reported in Table 2.

TABLE 2

|  | Ex. 3 | Ex. 4 | Ex. 5 | Ex. 6 | C. Ex. 3a | C. Ex. 3b | C. Ex. 5 | C. Ex. 6 |
|---|---|---|---|---|---|---|---|---|
| Components (% wt.) | | | | | | | | |
| HPO-1 | 36.5 | 26.5 | — | — | 39 | 36.5 | — | — |
| HPO-3 | 36.5 | 46.5 | 63 | 36.5 | 39 | 36.5 | 68 | 39 |
| HPO-4 | — | — | — | 36.5 | — | — | — | 39 |
| SEPS | 10 | 10 | 20 | 10 | 10 | 10 | 20 | 10 |
| EPR-1 | 10 | 10 | 10 | 10 | 10 | 10 | 10 | 10 |
| LLDPE | — | — | — | — | — | 5 | — | — |
| PE-WAX 1 | 5 | 5 | 5 | 5 | — | — | — | — |
| Carbon black | 2 | 2 | 2 | 2 | 2 | 2 | 2 | 2 |
| Properties | | | | | | | | |
| Shore A (0/5 sec) | 92/90 | 87/87 | 91/89 | 87/86 | 90/89 | 89/89 | 88/87 | 85/83 |
| Shore D (5 sec) | 34 | 32 | 35 | 32 | 34 | 34 | 33 | 32 |
| 100% Modulus (MPa) | 4.5 | 4.6 | 3.9 | 4.3 | 4.6 | 4.7 | 3.8 | 4.1 |
| Tensile Strength at Break (MPa) | 7.3 | 6.8 | 5 | 8.4 | 7.8 | 9.2 | 4.5 | 9.6 |
| Elongation at Break (%) | 630 | 580 | 553 | 690 | 625 | 685 | 348 | 730 |
| Taber Abrasion (mg/1000 cycles) | 17 | 25 | 35 | 32 | 58 | 57 | 123 | 68 |
| Reduction in Abrasion (%) | 70* | 56* | 71 | 52 | — | 2* | — | — |

TABLE 2-continued

|  | Ex. 3 | Ex. 4 | Ex. 5 | Ex. 6 | C. Ex. 3a | C. Ex. 3b | C. Ex. 5 | C. Ex. 6 |
|---|---|---|---|---|---|---|---|---|
| Scuff test (500 cycles) | Good | Moderate | Very good | Good | Very poor | Very poor | Mode-Rate | Poor |

*compared to C. Ex. 3a

The above results demonstrate that the polyolefin compositions of the comparative examples, in the absence of an oxidized polyethylene wax (II), have a poor abrasion: resistance and worst scuff resistance in comparison with the corresponding compositions containing such wax, according to the instant invention, while the hardness or stiffness of the compositions is not considerably affected.

EXAMPLES 7–8 AND COMPARATIVE EXAMPLES 7–8

Polymer compositions according to the present invention were obtained as reported in Example 1, containing different amounts of oxidized polyethylene wax (II). None of the samples showed any evidence of bloom.

The compositions of Comparative Examples 7–8 correspond to the ones of the Examples, with the exception that no oxidized polyethylene wax was added. The properties of these compositions, and in particular, the Taber Abrasion and the Scuff values are reported in Table 3.

TABLE 3

|  | Ex. 7 | Ex. 8 | Comp. Ex. 7 | Comp. Ex. 8 |
|---|---|---|---|---|
| Components (% wt.) |  |  |  |  |
| HPO-3 | 76 | 81 | 78 | 83 |
| SEPS | 10 | 5 | 10 | 5 |
| EPR-1 | 10 | 10 | 10 | 10 |
| PE-WAX 1 | 2 | 2 | — | — |
| Carbon black | 2 | 2 | 2 | 2 |
| Properties |  |  |  |  |
| Shore A (0/5 sec) | 87/87 | 88/88 | 88/88 | 87/86 |
| Shore D (5 sec) | 32 | 34 | 33 | 33 |
| 100% Modulus (MPa) | 3.9 | 4.7 | 4.4 | 4.4 |
| Tensile Strength at Break (MPa) | 4.3 | 5 | 5 | 5.1 |
| Elongation at Break (%) | 373 | 340 | 366 | 410 |

TABLE 3-continued

|  | Ex. 7 | Ex. 8 | Comp. Ex. 7 | Comp. Ex. 8 |
|---|---|---|---|---|
| Taber Abrasion (mg/1000 cycles) | 36 | 39 | 48 | 56 |
| Reduction in Abrasion (%) | 25 | 30 | — | — |
| Scuff test (500 cycles) | Good | Moderate/poor | Poor | Poor/very poor |

The above results demonstrate that, in the absence of an oxidized polyethylene wax (I), the compositions have a poor abrasion resistance and worst scuff resistance in comparison with the corresponding compositions containing such wax, according to the instant invention, while the hardness or stiffness of the compositions is not considerably affected.

EXAMPLES 9–11 AND COMPARATIVE EXAMPLES 9–11

Polymer compositions according to the present invention were obtained as reported in Example 1, with the further addition of mineral oil. In Examples 9 and 11, and the corresponding Comparative Examples, the heterophasic polyolefin composition was crosslinked by peroxide treatment in the presence of a polybutadiene coagent. The ingredients reported in Table 4 (except for oil) were premixed in a Henschel mill or a V-blender and tumble blended until the composition is uniform. The premix was then charged to the chamber of Haake internal mixer and mixed at 180° C. until fluxed (about 1 to 3 minutes) with a rotor speed of 100 RPM using Banbury type blades. Then oil was added and mixing continued until all the oil was incorporated (about 5 to 6 minutes).

None of the samples showed any evidence of bloom after 8 weeks time at 23° C.

The properties of these compositions, and in particular, the Taber Abrasion and the Scuff values are reported in Table 4.

TABLE 4

|  | Ex. 9 | Ex. 10 | Ex. 11 | Comp. Ex. 9 | Comp. Ex. 10 | Comp. Ex. 11 |
|---|---|---|---|---|---|---|
| Components (% wt.) |  |  |  |  |  |  |
| HPO-1 | 51.3 | — | — | 54 | — | — |
| HPO-4 | — | 47.7 | 47.7 | — | 50 | 50 |
| SEPS | — | 9.5 | 9.5 | — | 10 | 10 |
| SBS | 22 | 9.5 | 9.5 | 23 | 10 | 10 |
| OIL | 22 | 28.5 | 28.5 | 23 | 30 | 30 |
| PE-WAX 1 | 4.7 | 3.8 | 3.8 | — | — | — |
| Peroxide | 1 | — | 1 | 1 | — | 1 |
| Per. Coagent | 2.8 | — | 2.8 | 2.8 | — | 2.8 |
| Carbon black | 2 | — | — | 2 | — | — |
| ZnO | — | 2 | 2 | — | 2 | 2 |
| Stabilizer | 0.15 | 0.15 | 0.15 | 0.15 | 0.15 | 0.15 |

TABLE 4-continued

|  | Ex. 9 | Ex. 10 | Ex. 11 | Comp. Ex. 9 | Comp. Ex. 10 | Comp. Ex. 11 |
|---|---|---|---|---|---|---|
| Properties |  |  |  |  |  |  |
| Shore A (0/5 sec) | 87/88 | 61/56 | 64/60 | 68/65 | 54/50 | 58/55 |
| Shore D (5 sec) | 17 | — | — | 15 | — | — |
| 100% Modulus (MPa) | 2.7 | 1.4 | 1.9 | 2.5 | 1.3 | 1.6 |
| Tensile Strength at Break (MPa) | 6.5 | 3.9 | 6.2 | 5.7 | 4.3 | 5.8 |
| Elongation at Break (%) | 440 | 626 | 638 | 377 | 731 | 623 |
| Taber Abrasion (mg/1000 cycles) | 170 | 427 | 197 | 298 | 866 | 467 |
| Reduction in Abrasion (%) | 43 | 50 | 58 | — | — | — |
| Scuff test (500 cycles) | Moderate to good | — | — | Moderate | — | — |

The above results demonstrate that the polyolefin compositions of the comparative examples, in the absence of an oxidized polyethylene wax (II), have poorer abrasion resistance and worst scuff resistance in comparison with the corresponding compositions containing such wax, according to the instant invention, while the hardness or stiffness of the compositions is not considerably affected.

EXAMPLES 12–18

Polymer compositions according to the present invention were obtained as reported in Example 1, containing different kinds of oxidized polyethylene wax (II). None of the samples showed any evidence of bloom. The properties of these compositions, and in particular, the Taber Abrasion and the Scuff values are reported in Table 5.

The above results demonstrate the effect of various kinds of oxidized polyethylene wax (II) on the abrasion resistance of the compositions of the instant invention.

The invention claimed is:

1. A composition comprising:
(I) 65 to 90% by weight of an heterophasic polyolefin composition comprising the following fractions:
 A) from 10 to 25% by weight of a crystalline polymer fractions selected from the group consisting of:
  (i) a propylene homopolymer, having solubility in xylene at room temperature lower than 5% by weight;
  (ii) a copolymer of propylene and at least one alpha-olefin of formula $H_2C{=}CHR^1$, where $R^1$ is H or a $C_{2-10}$ linear or branched alkyl, containing at

TABLE 5

|  | Ex. 12 | Ex. 13 | Ex. 14 | Ex. 15 | Ex. 16 | Ex. 17 | Ex. 18 | C. Ex 12 |
|---|---|---|---|---|---|---|---|---|
| Components (% wt.) |  |  |  |  |  |  |  |  |
| HPO-2 | 76 | 74 | 74 | 74 | 74 | — | 74 | 78 |
| HPO-3 | — | — | — | — | — | 73 | — | — |
| SEPS | 10 | 10 | 10 | 10 | 10 | 10 | 10 | 10 |
| EPR-1 | 10 | 10 | 10 | 10 | 10 | 10 | — | 10 |
| EPR-2 | — | — | — | — | — | — | 10 | — |
| PE-WAX 1 | 2 | 4 | — | — | — | — | 4 | — |
| PE-WAX 2 | — | — | 4 | — | — | — | — | — |
| PE-WAX 3 | — | — | — | 4 | — | 5 | — | — |
| PE-WAX 4 | — | — | — | — | 4 | — | — | — |
| Carbon black | 2 | 2 | 2 | 2 | 2 | 2 | 2 | 2 |
| Properties |  |  |  |  |  |  |  |  |
| Shore A (0/5 sec) | 93/92 | 92/91 | 91/91 | 93/93 | 91/91 | 89/89 | 92/91 | 92/92 |
| Shore D (5 sec) | 34 | 35 | 37 | 36 | 36 | 32 | 35 | 35 |
| 100% Modulus (MPa) | 4.9 | 4.8 | 4.3 | 4.6 | 4.5 | 4 | 4.3 | 4.8 |
| Tensile Strength at Break (MPa) | 5.3 | 4.9 | 4.4 | 5.2 | 4.6 | 4.2 | 4.5 | 5.5 |
| Elongation at Break (%) | 239 | 265 | 270 | 290 | 240 | 380 | 290 | 320 |
| Taber Abrasion (mg/1000 cycles) | 42 | 32 | 42 | 44 | 58 | 27 | 43 | 76 |
| Reduction in Abrasion (%) | 45** | 58** | 45** | 42** | 24** | 43* | 45** | — |

*compared to Comp. Ex. 7
**compared to Comp. Ex. 12 least 90% by weight of propylene, having solubility in xylene at room temperature lower than 10% by weight; and (iii) a mixture of (i) and (ii); and B) from 75 to 90% by weight of an elastomeric fraction comprising an elastomeric copolymer of propylene or ethylene with at least another alpha-olefin of formula $H_2C=CHR^2$, where $R^2$ is H or a $C_{1-10}$ linear or branched alkyl, optionally containing 0.5 to 5% by weight of a diene, said elastomeric copolymer containing from 20 to 50% by weight alpha-olefin, and having solubility in xylene at room temperature greater than 80% by weight, the intrinsic viscosity of the xylene soluble fraction ranging from 4.0 to 5.5 dl/g;

(II) 5 to 15% by weight of an oxidized polyethylene wax having an acid number ranging from 5 to 35 mg KOH/g, a molecular weight Mn of 1000 to 100,000, and a melting point comprised between 92° C. and 140° C.; and (III) 5 to 20% by weight of a styrene block copolymer.

2. The composition according to claim 1, wherein in the heterophasic polyolefin composition (I) the amount of the fraction (A) ranges from 12 to 20% by weight and the amount of fraction (B) ranges from 80 to 88% by weight.

3. The composition according to claim 1, wherein the fraction (A) is a propylene homopolymer having solubility in xylene at room temperature lower than 3% by weight.

4. The composition according to claim 1, wherein the fraction (A) is a copolymer of propylene and ethylene containing at least 90% by weight of propylene, having solubility in xylene at room temperature lower than 8% by weight.

5. The composition according to claim 1, wherein the elastomeric fraction (B) comprises:

(1) a first elastomeric copolymer of propylene with at least an alpha-olefin of formula $H_2C=CHR^3$, where $R^3$ is H or a $C_{2-10}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and (2) a second elastomeric copolymer of propylene with at least an alpha-olefin of formula $H_2C=CHR^4$, where $R^4$ is H or a $C_{2-10}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;

the (1)/(2) weight ratio ranging from 1:5 to 5:1.

6. The composition according to claim 5, wherein said first elastomeric copolymer is a copolymer of propylene with from 25 to 30% of at least one alpha-olefin selected from ethylene, butene-1, hexene-1 and octene-1, and has a solubility in xylene at room temperature greater than 70%, the intrinsic viscosity of the xylene soluble fraction ranging from 3.5 to 4.5 dl/g.

7. The composition according to claim 5, wherein said second elastomeric copolymer is a copolymer of propylene with from 35 to 40% by weight of at least one alpha-olefin selected from ethylene, butene-1, hexene-1 and octene-1, and has solubility in xylene at room temperature greater than 85%, the intrinsic viscosity of the xylene soluble fraction ranging from 4.5 to 6.0 dl/g.

8. A composition comprising:

(I) 65 to 90% by weight of an heterophasic polyolefin composition comprising the following fractions:

A) from 10 to 25% by weight of a crystalline polymer fractions selected from the group consisting of:

(i) a propylene homopolymer, having solubility in xylene at room temperature lower than 5% by weight;

(ii) a copolymer of propylene and at least one alpha-olefin of formula $H_2C=CHR^1$, where $R^1$ is H or a $C_{2-10}$ linear or branched alkyl, containing at least 90% by weight of propylene, having solubility in xylene at room temperature lower than 10% by weight; and (iii) a mixture of (i) and (ii); and B) from 75 to 90% by weight of an elastomeric fraction comprising (1') a first elastomeric copolymer of propylene with ethylene, optionally containing 0.5 to 5% by weight of a diene, containing from 20 to 35% by weight ethylene, and having solubility in xylene at room temperature greater than 70% by weight, the intrinsic viscosity of the xylene soluble fraction ranging from 3.0 to 6.0 dl/g; and (2') a second elastomeric copolymer of ethylene with at least an alpha-olefin of formula $H_2C=CHR^5$, where $R^5$ is a $C_{2-10}$ linear or branched alkyl, optionally containing 0.5 to 5% by weight of a diene, containing from 15% to 40% by weight alpha-olefin, and having solubility in xylene at room temperature greater than 25% by weight, the intrinsic viscosity of the xylene soluble fraction ranging from 0.5 to 5.0 dl/g;

the (1')/(2') weight ratio ranging from 1:5 to 5:1;

(II) 5 to 15% by weight of an oxidized polyethylene wax having an acid number ranging from 5 to 35 mg KOH/g, a molecular weight Mn of 1,000 to 100,000, and a melting point comprised between 92° C. and 140° C.; and (III) 5 to 20% by weight of a styrene block copolymer.

9. The composition according to claim 8, wherein said first elastomeric copolymer (1') has an ethylene content ranging from 25 to 30% by weight, and has a solubility in xylene at room temperature greater than 75%, the intrinsic viscosity of the xylene soluble fraction ranging from 3.5 to 5.0 dl/g.

10. The composition according to claim 8, wherein said second elastomeric copolymer (1') is a copolymer of propylene with from 20 to 35% by weight of at least one alpha-olefin selected from butene-1, hexene-1 and octene-1, and has solubility in xylene at room temperature greater than 30% by weight, the intrinsic viscosity of the xylene soluble fraction ranging from 1.0 to 4.5 dl/g.

11. The composition according to claim 1, wherein the oxidized polyethylene wax (II) is present in an amount ranging from 5 to 15% by weight, has an acid number ranging from 10 to 25 mg KOH/g, a molecular weight Mn of 2,000 to 50,000, and a melting point comprised between 110° C. and 140° C.

12. The composition according to claim 1, wherein the styrene block copolymer (III) is present in an amount ranging from 5 to 20% by weight, has formula A-B-A', where A and A' are thermoplastic endblocks selected from polystyrene and polystyrene homologs, and B is an elastomeric polybutadiene, poly(ethylenebutylene) or poly(ethylenepropylene) midblock.

13. The composition according to claim 12, wherein the styrene block copolymer (III) is a styrene-butadiene-styrene, poly-ethylenebutylene-styrene or styrene-ethylenepropylene-styrene copolymer.

14. The polyolefin composition according to claim 1, having a 100% modulus lower than 6 MPa, Shore A hardness lower than 95, and elongation at break greater than 225%.

15. A plasticized composition comprising:
  a) 100 parts by weight of a composition comprising:
  (I) 65 to 90% by weight of an heterophasic polyolefin composition comprising the following fractions:
    A) from 10 to 25% by weight of a crystalline polymer fractions selected from the group consisting of:
      (i) a propylene homopolymer, having solubility in xylene at room temperature lower than 5% by weight;
      (ii) a copolymer of propylene and at least one alpha-olefin of formula $H_2C=CHR^1$, where $R^1$ is H or a $C_{2-10}$ linear or branched alkyl, containing at least 90% by weight of propylene, having solubility in xylene at room temperature lower than 10% by weight; and
      (iii) a mixture of (i) and (ii); and
    B) from 75 to 90% by weight of an elastomeric fraction comprising an elastomeric copolymer of propylene or ethylene with at least another alpha-olefin of formula $H_2C=CHR^2$, where $R^2$ is H or a $C_{1-10}$ linear or branched alkyl, optionally containing 0.5 to 5% by weight of a diene, said elastomeric copolymer containing from 20 to 50% by weight alpha-olefin, and having solubility in xylene at room temperature greater than 80% by weight, the intrinsic viscosity of the xylene soluble fraction ranging from 0 to 5.5 dl/g;
  (II) 5 to 15% by weight of an oxidized polyethylene wax having an acid number ranging from 5 to 35 mg KOH/g, a molecular weight Mn of 1,000 to 100,000, and a melting point comprised between 92° C. and 140° C.; and
  (III) 5 to 20% by weight of a styrene block copolymer; and
  b) 5 to 50 parts by weight of a plasticizer (IV).

16. The plasticized composition according to claim 15, wherein the plasticizer (IV) is contained in an amount ranging from 10 to 40 parts by weight, and is selected from mineral oil, process oil, aromatic oil, naphthenic oil, paraffin oil, linear dodecylbenzene, dialkylbenzenes, diphenylalkanes and mixtures thereof.

17. An article comprising a composition comprising:
  (I) 65 to 90% by weight of an heterophasic polyolefin composition comprising the following fractions:
    A) from 10 to 25% by weight of a crystalline polymer fractions selected from the group consisting of:
      (i) a propylene homopolymer, having solubility in xylene at room temperature lower than 5% by weight;
      (ii) a copolymer of propylene and at least one alpha-olefin of formula $H_2C=CHR^1$, where $R^1$ is H or a $C_{2-10}$ linear or branched alkyl, containing at least 90% by weight of propylene, having solubility in xylene at room temperature lower than 10% by weight; and
      (iii) a mixture of (i) and (ii); and
    B) from 75 to 90% by weight of an elastomeric fraction comprising an elastomeric copolymer of propylene or ethylene with at least another alpha-olefin of formula $H_2C=CHR^2$, where $R^2$ is H or a $C_{1-10}$ linear or branched alkyl, optionally containing 0.5 to 5% by weight of a diene, said elastomeric copolymer containing from 20 to 50% by weight alpha-olefin, and having solubility in xylene at room temperature greater than 80% by weight, the intrinsic viscosity of the xylene soluble fraction ranging from 4.0 to 5.5 dl/g;
  (II) 5 to 15% by weight of an oxidized polyethylene wax having an acid number ranging from 5 to 35 mg KOH/g, a molecular weight Mn of 1,000 to 100,000, and a melting point comprised between 92° C. and 140° C.; and
  (III) 5 to 20% by weight of a styrene block copolymer.

18. An article comprising a plasticized composition comprising:
  (I) from 65 to 90% by weight of an heterophasic polyolefin composition comprising the following fractions:
    A) from 10 to 25% by weight of a crystalline polymer fractions selected from the group consisting of:
      (i) a propylene homopolymer, having solubility in xylene at room temperature lower than 5% by weight;
      (ii) a copolymer of propylene and at least one alpha-olefin of formula $H_2C=CHR^1$, where $R^1$ is H or a $C_{2-10}$ linear or branched alkyl, containing at least 90% by weight of propylene, having solubility in xylene at room temperature lower than 10% by weight;
      (iii) a mixture of (i) and (ii); and
    B) from 75 to 90% by weight of an elastomeric fraction comprising an elastomeric copolymer of propylene or ethylene with at least another alpha-olefin of formula $H_2C=CHR^2$, where $R^2$ is H or a $C_{1-10}$ linear or branched alkyl, optionally containing 0.5 to 5% by weight of a diene, said elastomeric copolymer containing from 20 to 50% by weight alpha-olefin, and having solubility in xylene at room temperature greater than 80% by weight, the intrinsic viscosity of the xylene soluble fraction ranging 4.0 to 5.5 dl/g;
  (II) 5 to 15% by weight of an oxidized polyethylene wax having an acid number ranging from 5 to 35 mg KOH/g, a molecular weight Mn of 1,000 to 100,000, and a melting point comprised between 92° C. and 140° C.; and
  (III) 5 to 20% by weight of a styrene block copolymer; and 5 to 50 parts by weight of a plasticizer (IV).

* * * * *